(12) United States Patent
Wright

(10) Patent No.: US 8,037,516 B2
(45) Date of Patent: Oct. 11, 2011

(54) AUTHENTICATION TOKENS FOR USE IN VOICE OVER INTERNET PROTOCOL

(75) Inventor: Steven Allan Wright, Roswell, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1613 days.

(21) Appl. No.: 11/362,970

(22) Filed: Feb. 27, 2006

(65) Prior Publication Data

US 2007/0201447 A1    Aug. 30, 2007

(51) Int. Cl.
*G06F 7/04* (2006.01)

(52) U.S. Cl. ............ 726/9; 370/352; 370/353; 370/354; 370/355; 370/356; 709/227; 709/228

(58) Field of Classification Search .......... 370/352–356; 709/227–228; 726/9
See application file for complete search history.

(56) References Cited

U.S. PATENT DOCUMENTS

| | | | |
|---|---|---|---|
| 6,226,751 B1 * | 5/2001 | Arrow et al. | 726/15 |
| 6,956,820 B2 * | 10/2005 | Zhu et al. | 370/230.1 |
| 7,266,121 B2 * | 9/2007 | Raisanen | 370/392 |
| 7,457,283 B2 * | 11/2008 | Dalton et al. | 370/352 |
| 2002/0071426 A1 * | 6/2002 | Karamchedu et al. | 370/352 |
| 2007/0036139 A1 * | 2/2007 | Patel et al. | 370/352 |
| 2007/0201447 A1 * | 8/2007 | Wright | 370/356 |
| 2009/0199286 A1 * | 8/2009 | Singhal | 726/9 |

* cited by examiner

*Primary Examiner* — Thanhnga Truong
*Assistant Examiner* — Angela Holmes
(74) *Attorney, Agent, or Firm* — Myers Bigel Sibley & Sajovec

(57) ABSTRACT

Setup of a Voice over Internet Protocol (VoIP) call is initiated and an authentication token is received for the VoIP call that is set up, that indicates that the VoIP call is authorized. The authentication token is inserted into packets for the VoIP call. The packets, including the authentication token therein, are transmitted into an IP network. The authentication token may be placed in an IP version 6 (IPv6) flowID field.

10 Claims, 4 Drawing Sheets

AUTHENTICATION TOKENS FOR USE IN VOICE OVER INTERNET PROTOCOL

FIELD OF THE INVENTION

This invention relates to telecommunications systems, methods, devices and computer program products, and more particularly to Voice over Internet Protocol (VoIP) systems, devices, methods and computer program products.

BACKGROUND OF THE INVENTION

Voice over Internet Protocol (VoIP) technology is being used to transmit voice and/or multimedia phone calls as data packets over an Internet Protocol (IP) network, such as the Internet. In VoIP calling, an originating device, such as an analog telephone adapter, an IP phone or a computer, initiates a phone call by signaling to a central call processor, also referred to as a call processor or softswitch, which sets up the call between the originating device and a destination device using conventional signaling protocols. Once a session is established, packets are sent between the originating device and the destination device using the conventional Internet infrastructure, wherein the packets are routed among multiple routers from the originating device to the destination device.

Unfortunately, it may be possible for a VoIP originating device to transmit packets into the IP network in a manner that is not authorized by the call processor. For example, a specified number of packets, a specified type of packet (voice/multimedia/data) and/or a specified quality of service of packets may be exceeded due to an error in the originating device and/or due to deliberate fraud and/or spoofing by the originating device. When the allocated number, type and/or quality of service is exceeded, the quality of VoIP service provided to other originating devices may be impacted and/or inadequate billing may be generated for the excess packets/quality of service. These issues may be exacerbated in a Virtual Private Network (VPN), wherein VoIP technology is used to provide a specified call volume and/or quality of service among a group of originating and destination devices over an IP network. Again, inadvertent or deliberate overuse of IP network bandwidth can impact the bandwidth that is available to other users, can impact the billing and/or produce other problems for a VoIP network provider.

SUMMARY OF THE INVENTION

Some embodiments of the present invention provide a Voice over Internet Protocol (VoIP) calling method, wherein setup of a VoIP call is initiated and an authentication token is received for the VoIP call that is set up, that indicates that the VoIP call is authorized. The authentication token is inserted into packets for the VoIP call. The packets, including the authentication token therein, are then transmitted into an IP network. In some embodiments, the packets are not transmitted into the IP network if the authentication token for the VoIP call is not received.

In some embodiments, the packets are IP version 6 (IPv6) packets that include a flowID field, also referred to as a "flow label" field. The authentication token is inserted into the flowID field of the packets. In other embodiments, other versions of IP, such as IPv4, may be used.

VoIP call setup methods according to some embodiments of the present invention receive a request to set up a VoIP call from a device that initiates a VoIP call. An authentication token is provided to the device if the request to set up a VoIP call is authorized. An authentication token is not provided to the device if the request to set up the VoIP call is not authorized. In some embodiments, the authentication token is compatible with an IPv6 flowID field.

In some embodiments, the authentication token and parameters governing the use of the authentication token, are received prior to distributing the authentication token. For example, a time frame in which the authentication token is to be used and/or an identification of originating device(s) for which the authentication token is to be used, may be received. In some embodiments, a given VoIP authentication token may be used for multiple VoIP calls that are set up for a given VoIP call originating device within a given time frame. Moreover, in other embodiments, a given authentication token may be used for multiple VoIP calls from multiple devices within a given time frame.

In some embodiments, a measure of authentication tokens that were provided to a call originating device may be logged for billing purposes, so that it can be determined whether billing for the device, or for a virtual private network that encompasses the device, accurately reflects the network usage.

The VoIP packets, including the authentication token therein, are routed through an IP network form the call originating device to a destination device. Routing may be performed, according to some embodiments of the present invention, by receiving a VoIP packet and refraining from routing the VoIP packet that was received to a next node in the IP network, responsive to absence of a valid authentication token in the VoIP packet. As was described above, the authentication token may be included in the flowID field of an IPv6 packet. Moreover, prior to performing the routing, the authentication token and parameters governing validity of the authentication token may be received at one or more routers in the IP network.

Embodiments of the present invention have been described above in connection with VoIP calling methods, VoIP call setup methods and VoIP routing methods. The VoIP calling methods may be performed by a VoIP call originating device, whereas the VoIP call setup methods may be performed by a call processor, such as a softswitch, and the VoIP routing methods may be performed by an IP network router. VoIP call originating devices, VoIP call setup devices and VoIP routers that are configured to perform these methods also may be provided according to other embodiments of the present invention. Moreover, analogous computer program products that comprise a computer-usable storage medium having computer-readable program code embodied in the medium also may be provided according to other embodiments of the present invention. IPv6 data packets also may be provided according to some embodiments of the present invention. These IPv6 data packets may include a sourceID field, a destinationID field and payload data that is to be transmitted from the source to the destination. A flowID field also is provided that includes therein an authentication token that indicates that transport of the data packet is authorized.

Embodiments of the invention have been described with respect to VoIP calling. However, other embodiments of the invention may be used for packet transmission in a Virtual Private Network (VPN). For example, packet transmission methods for a VPN according to some embodiments of the present invention can initiate setup of a packet transmission over the VPN, receive an authentication token for the packet transmission that is set up that indicates that the packet transmission is authorized over the VPN, insert the authentication token into packets for the packet transmission, and transmit the packets including the authentication token therein, into the VPN. The flowID field in IPv6 packets may be used, as was described above. Analogous packet transmission setup and routing methods, devices and computer program products also may be provided.

DETAILED DESCRIPTION

Figure 1:
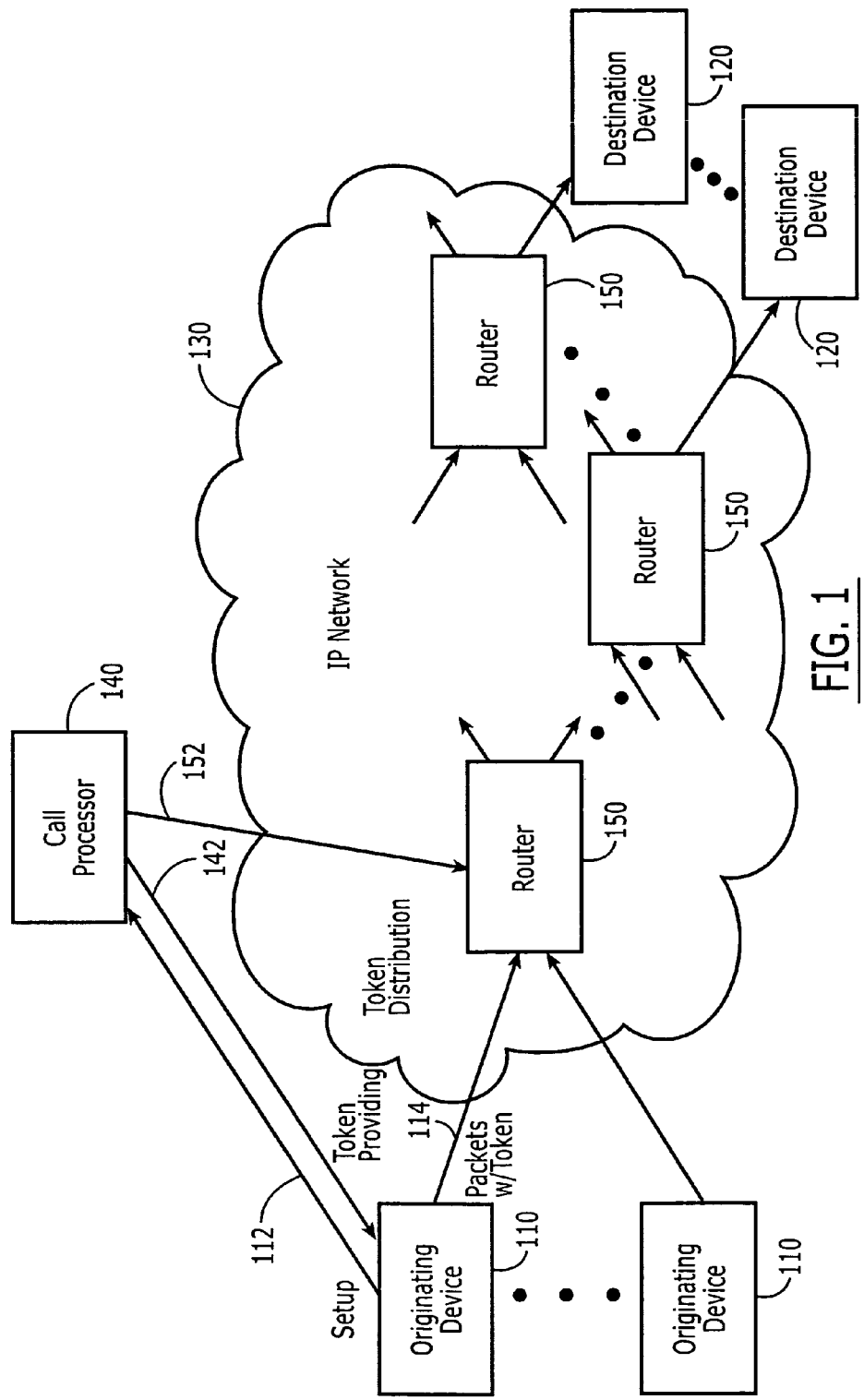
FIG. 1 is a block diagram of VoIP networks, systems, devices, methods and computer program products that use authentication tokens, according to some embodiments of the present invention.

The present invention now will be described more fully hereinafter with reference to the accompanying figures, in which embodiments of the invention are shown. This invention may, however, be embodied in many alternate forms and should not be construed as limited to the embodiments set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like numbers refer to like elements throughout the description of the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components, but do not preclude the presence or addition of one or more other features, integers, steps, operations, elements, components, and/or groups thereof. Moreover, when an element is referred to as being "responsive" to another element, it can be directly responsive to the other element, or intervening elements may be present. In contrast, when an element is referred to as being "directly responsive" to another elements, there are no intervening elements present. As used herein the term "and/or" includes any and all combinations of one or more of the associated listed items and may be abbreviated as "/". It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure.

The present invention is described below with reference to block diagrams and/or flowchart illustrations of methods, apparatus (systems) and/or computer program products according to embodiments of the invention. It is understood that a block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means (functionality) and/or structure for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated.

FIG. 1 is a block diagram of VoIP networks, systems, devices, methods and computer program products that use authentication tokens, according various embodiments of the present invention. As shown in FIG. 1, a plurality of originating devices 110 and a plurality of destination devices 120 communicate with one another over an IP network 130, such as the Internet, using VoIP technology. As known to those having skill in the art, a VoIP originating device 110 (also known as a "VoIP phone") may be embodied using an analog telephone adapter, a specialized IP phone and/or a hardware/software package running on a general purpose computer. The VoIP phone may be configured for voice, video and/or data calls. Call setup is provided by a call processor 140, also referred to as a "Next Generation Network (NGN) server" or a "softswitch". Packets are routed through the IP network by a plurality of routers 150. As is well known, an originating device 110 may also function as a destination device 120, and vice versa. It will also be understood that large numbers of originating devices 110, destination devices 120 and routers 150 generally may be associated with a given IP network 130, such as the Internet, and multiple call processors 140 also may be provided.

Call setup is conventionally provided by passing signals between the originating device 110 and the call processor 140 over dedicated connections and/or over the IP network 130 itself. Once the call is set up, packets including the VoIP payload (voice, video and/or data) are transmitted by the originating device 110 into the IP network 130.

Unfortunately, an originating device 110 may transmit packets to the IP network 130 without the proper call setup and/or in violation of the characteristics set up for the call. For example, a given originating device 110 may subscribe with a VoIP network provider for a certain volume (number) and/or quality of service of VoIP packets. However, the originating device 110 may inadvertently, or as a result of deliberate desire to cheat the network provider, transmit packets at a higher volume and/or a higher quality of service than was subscribed to. Moreover, multiple originating devices 110 and destination devices 120 may be linked in a virtual private network, and may be governed by predetermined volume; bandwidth and/or quality of service constraints that were agreed upon with the network provider. Yet, after call setup, an originating device in a VPN may transmit at a higher volume, bandwidth and/or quality of service, either inadvertently or in a deliberate attempt to obtain services that were not subscribed to.

According to some embodiments of the present invention, an originating device is configured to receive an authentication token for the VoIP call that indicates that the VoIP call is authorized, and to insert the authentication token into the packets for the VoIP call. A router, such as a router 150, is configured to refrain from routing a VoIP packet that was received to a next node in the IP network 130, unless a valid authentication token is included in the VoIP packet. The authentication token(s) may be updated with sufficient frequency so as to reduce the likelihood of an originating device transmitting packets in a manner that is unauthorized.

Figure 2:
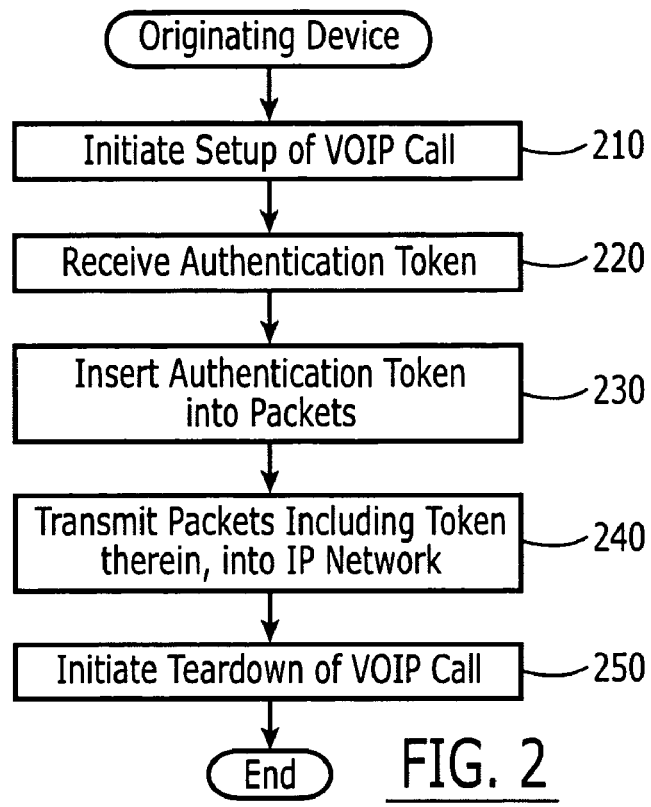
FIG. 2 is a flowchart of operations that may be performed by an originating device, according to some embodiments of the present invention.

FIG. 2 is a flowchart of operations that may be performed by an originating device, such as an originating device 110 of FIG. 1, to provide VoIP calling according to some embodiments of the present invention. Referring now to FIG. 2, at Block 210, setup of a VoIP call is initiated. Setup may be initiated by communicating between the originating device 110 and the call processor 140 of FIG. 1, as shown by the setup line 112 of FIG. 1. Then, at Block 220, an authentication token is received by the originating device 110 from the call processor 140, as indicated by the token providing arrow 142 of FIG. 1. As used herein, an "authentication token" is a value (numeric, alpha or alphanumeric) that may be detected to indicate that the transmission of a data packet is authorized by the IP network provider. An authentication token may also be referred to as a "password". A given authentication token may be used for a given set of IP packets that are transmitted for a given VoIP call, in some embodiments. A given authentication token also may be used for more than one IP call and/or for more than one originating device, depending upon a level of security that may be desired for the IP network, in other embodiments.

It will be understood by those having skill in the art that the setup operations of Block 210 and the receiving of an authentication token at Block 220, may be performed outside the IP network as shown by the lines 112, 142 in FIG. 1 and/or by transmitting messages within the IP network 130 itself. Generation of authentication tokens by a call processor 140, according to some embodiments of the invention, will be described in further detail below.

Continuing with the description of FIG. 2, the authentication token is inserted into the IP packet. When IP version 4 (IPv4) or IP version 6 (IPv6) are used in the IP network 130, a predetermined field in an IPv4 and/or IPv6 packet may be used for placement of the authentication token therein. In IPv4, a proprietary protocol extension may be developed for placement of the authentication token therein. For example, an authentication header may be defined. A particular configuration of an IPv6 data packet that may be particularly suitable for placement of the authentication token therein will be described in detail in connection with FIG. 3.

Continuing with the description of FIG. 2, at Block 240, the packets, including the authentication token(s) therein, are transmitted into the IP network, such as the IP network 130 of FIG. 1, for example as shown by line 114 of FIG. 1. In some embodiments, the packets are transmitted an edge router, i.e., a router that is closest to the originating device 110, which then transmits the IP packets to other routers, until a destination device 120 is reached. Operations performed by a router 150 according to some embodiments of the present invention will be described in detail below.

Figure 3:
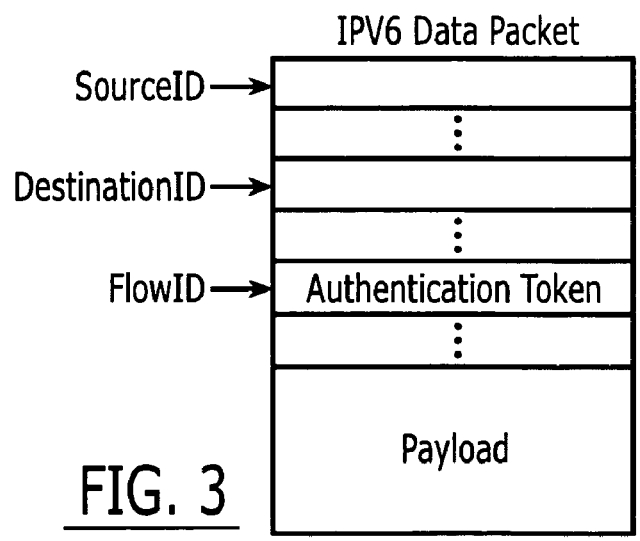
FIG. 3 illustrates a data structure of an IPv6 data packet, according to some embodiments of the present invention.

FIG. 3 schematically illustrates a data structure of an IPv6 data packet according to some embodiments of the present invention. The conventional data structure of an IPv6 data packet is governed by the IPv6 specifications, and generally includes a sourceID field that indicates an identification of an originating device, a destinationID field that indicates an identification of a destination device, and a payload, which provides the voice, video and/or data payload to be transmitted in the IPv6 data packet. A flowID field also is provided. The flowID field may be used for one or more purposes according to the IPv6 specifications. For example, a flowID may be used to identify all packets of a given flow, as a key for a hash function to assess relevant information for the handling of a packet, to support header compression and/or for other purposes. According to some embodiments of the present invention, the flowID field is used to store therein an authentication token, which is provided by a call processor 140 to an originating device 110, and which may be used to indicate that the transmission of the IPv6 data packet has been authorized by the call processor 140. In some embodiments, the authentication token is 16 bits long. However, in other embodiments, longer or shorter authentication tokens may be used.

Figure 4:
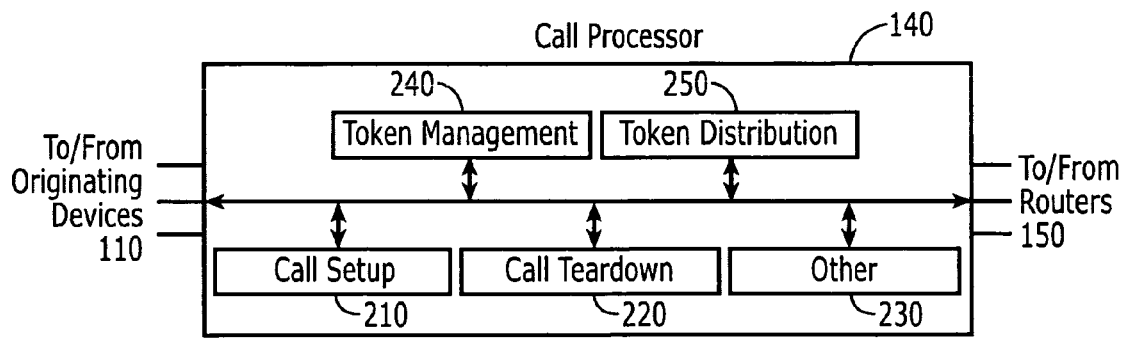
FIG. 4 is a block diagram of a call processor, according to some embodiments of the present invention.

FIG. 4 is a block diagram of a call processor, such as a call processor 140 of FIG. 1, according to various embodiments of the present invention. As shown in FIG. 4, a call processor 140 includes a call setup function 210 that is configured to receive a request to set up a VoIP call from a device that initiates a VoIP call, such as an originating device 110 of FIG. 1, and to provide an authentication token to the device 110 if the request to set up a VoIP call is authorized. A call teardown function 220 is provided to tear down the call path after the call is completed. Other conventional functionality 230 also may be provided.

Still referring to FIG. 4, a token management function 240 and a token distribution function 250 also are provided. The token management function 240 generates and/or stores authentication tokens, and provides a given authentication token to the call setup function 210 for a given call for a given originating device 110. The token distribution function 250 distributes valid authentication tokens to one or more routers 150, so that the router(s) 150 may be able to test for a valid token.

More specifically, the token management function 240 may determine the frequency and/or protocol under which new tokens are to be generated, used and/or distributed. In particular, in some embodiments, a unique authentication token may be used for every unique VoIP call from every unique VoIP call originating device 110. However, such a scheme may place an undue burden on the token distribution function 250 and/or on the routers 150, and may create an unneeded level of security. In other embodiments of the invention, a given authentication token may be used for two or more VoIP calls that originate from a given VoIP device 110 and/or for any number of VoIP calls that originate from a given VoIP call originating device 110 during a given time frame. In yet other embodiments, a given token may be used for one or more calls that originate from multiple originating devices 110 and/or multiple calls that originate from multiple originating devices during a given time frame.

For example, in specific embodiments, a given token may be used for given originating device 110 for a 24-hour period. In other embodiments, a series of tokens may be used for a given device 110 over a given 24-hour period. In yet other embodiments, all of the originating devices 110 in a VPN may use a single token or a set of tokens during a given time period. In still other embodiments, all of the originating devices 110 on the network or on a virtual private network may use a given token during a given 6-hour time period.

More simple or more complicated token management protocols may be used, depending on the level of security that may be desired. These token management protocols may be static or may change over time, depending, for example, on the size of the network and/or the amount of spoofing that is detected. Token management schemes may be analogized to key management schemes that are widely used to distribute keys or passwords for financial transactions and/or other encrypted transactions. Thus, techniques that are used for key distribution may be used according to embodiments of the present invention.

The token distribution function 250 distributes tokens to the routers 150 of the IP network 130, for example as shown by line 152 of FIG. 1. In some embodiments, all tokens that are valid within a given time period may be distributed to all routers 150. In other embodiments, however, only a subset of the tokens need be distributed to a subset of the routers 150. Thus, a router 150 that is closest to an originating device 110 (an "edge router") may only need to obtain the tokens that apply to the given closest originating device(s), as will be described in detail below.

Figure 5:
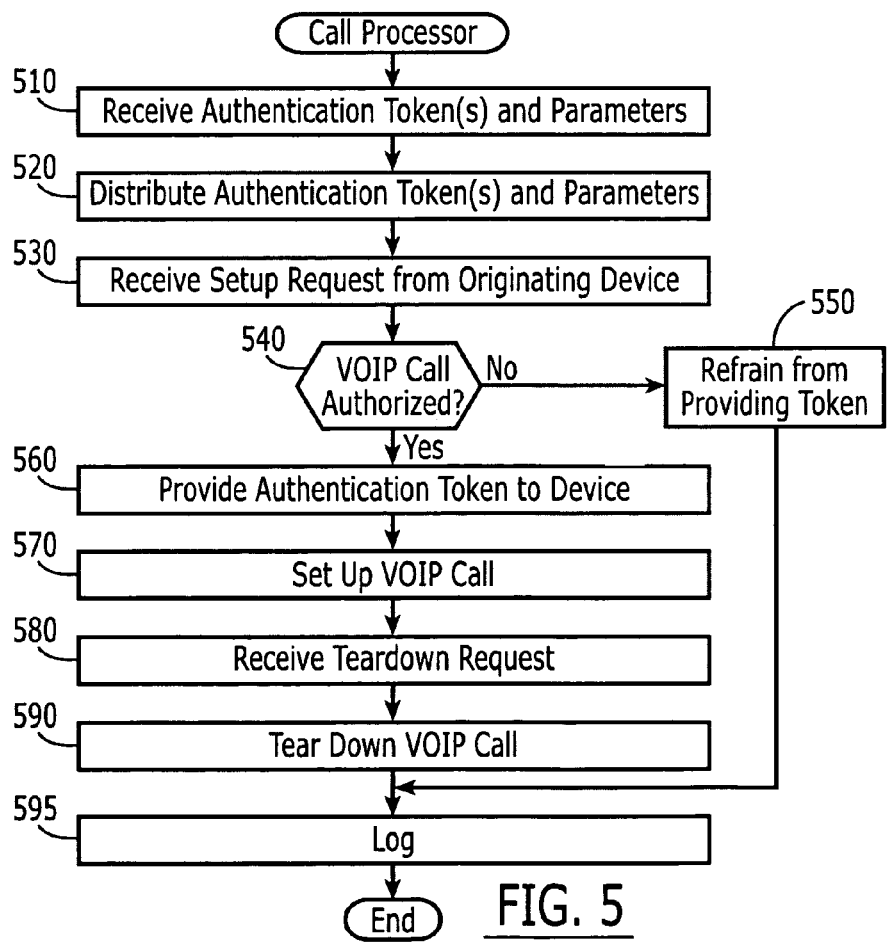
FIG. 5 is a flowchart of operations that may be performed by call processor, according to some embodiments of the present invention.

FIG. 5 is a flowchart of operations that may be performed by a call processor, such as the call processor 140 of FIGS. 1 and/or 4, to set up a VoIP call according to some embodiments of the present invention. Referring now to FIG. 5, at Block 510, one or more authentication tokens and parameters governing their use are received (from external to the device and/or by internal generation), for example using the token management function 240 of FIG. 4. As was described above, the parameters governing use of the authentication token(s) can comprise a time frame in which the authentication token is to be used and/or an identification of originating device(s) for which the authentication token is to be used. Other parameters governing use of the authentication token also may be provided. At Block 520, the authentication token and parameters are distributed, for example using the token distribution function 250 of FIG. 4 and/or token distribution line 152 of FIG. 1.

Continuing with the description of FIG. 5, at Block 530, a setup request is received from an originating device 110 using, for example, the call setup function 210 of FIG. 4, and the setup line 112 of FIG. 1. A determination is then made, at Block 540, as to whether the VoIP call is authorized. This determination may be based on the number of VoIP calls that have been previously authorized for the originating device 110 and/or other originating devices within a VPN over a predetermined time period, the number of VoIP calls authorized for the originating device 110 and/or other originating devices in a VPN concurrently, other services being requested concurrently and/or over a given period of time, the quality of service requested by the present VoIP call, previous VoIP calls and/or other VoIP calls, and/or other parameter(s) that are set up by the IP network provider to measure network usage compared to authorized network usage. In other embodiments, a determination also may be made as to whether the customer is current in their bill payments.

Continuing with the description of FIG. 5, if the VoIP call is authorized at Block 540, then the appropriate authentication token is provided to the originating device 110 at Block 560 using the call setup function 210 of FIG. 4 and the token line 142 of FIG. 1, and a VoIP call is set up at Block 570. Upon receipt of a teardown request at Block 580, the VoIP call is torn down at Block 590, using the call teardown function 220 of FIG. 4. Moreover, at Block 540, if the VoIP call is not authorized, then at Block 550 the token is not provided and teardown is provided at Block 590.

Finally, at Block 595, according to some embodiments of the present invention, a measure of the authentication token (s) that were provided is logged at Block 595. Logging may be provided so that when a given volume, bandwidth and/or quality of service is exceeded, actions may take place by the network provider. These actions may include refusing to provide further authentication tokens until a higher volume and/or quality of service is paid for, or automatically increasing the billings to the customer, to account for the excess use. In other embodiments, "lazy billing" may be provided, wherein excess use is logged over a period of time, and then a customer, such as a VPN customer, is provided statistics about the excess use and provided with a new billing scheme, to accommodate the increased use. Other conventional logging and/or billing schemes may be used based on a measure of the authentication tokens that were provided over a given time.

Figure 6:
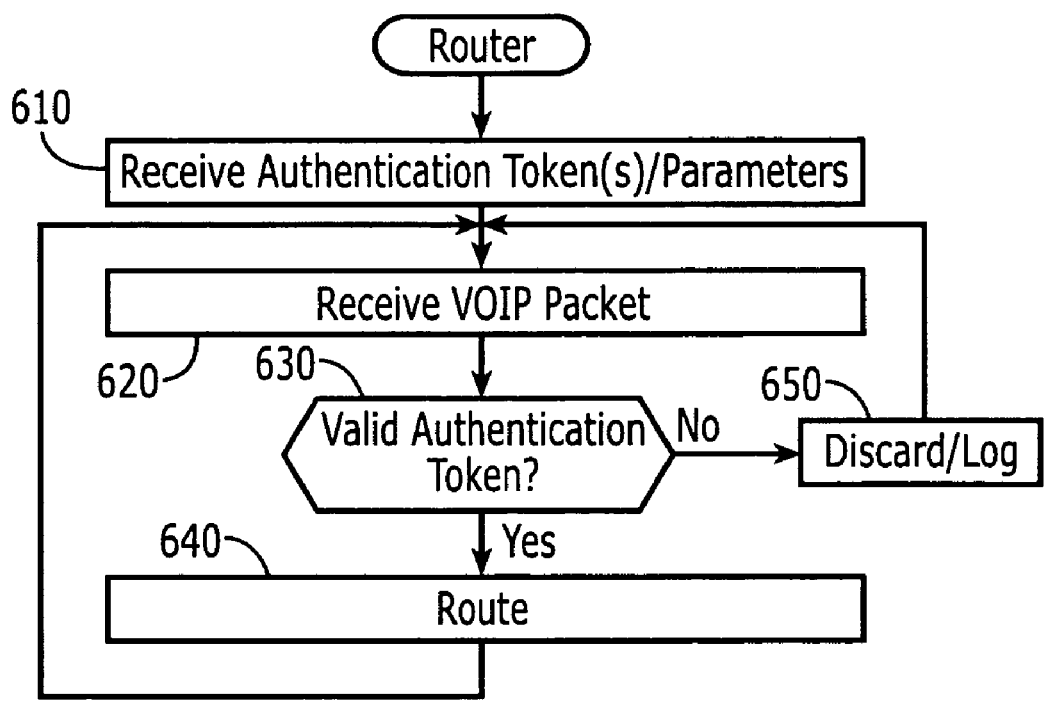
FIG. 6 is a flowchart of operations that may be performed by a router, according to some embodiments of the present invention.

FIG. 6 is a flowchart of operations that may be performed to route VoIP packets according to some embodiments of the present invention. These operations may be performed by a router 150 of FIG. 1. Referring to FIG. 6, at Block 610, authentication token(s) and parameters governing validity of the authentication token(s) are received. For example, a list of authentication tokens and a time frame in which the authentication tokens are valid, and/or a list of origination addresses for which the authentication tokens are valid, may be received and stored at the router 150. The authentication token(s) and/or parameters may be received via a token distribution line 152 of FIG. 1.

Then, referring to Block 620, a VoIP packet is received by the router 150, such as over the packet transmission line 114 of FIG. 1. In some embodiments, the VoIP packet is an IPv6 packet of FIG. 3 that includes a flowID field. A test is made at the router 150, at Block 630, as to whether the authentication token is valid. In some embodiments, the validity is tested at Block 630 by checking the flowID field of an IPv6 packet. If yes, then the packet is routed to a next router and/or to a destination device at Block 640. If not, the packet may be discarded and/or logged at Block 650, but is refrained from being routed to a next node in an IP network.

It will be understood by those having skill in the art that, in some embodiments, every router 150 of the IP network 130 can perform the operations of FIG. 6. However, in other embodiments, only subset of the routers 150 of the network 130 need perform the operations of FIG. 6. In particular, once a router that is closest to an originating device 110, also referred to as an "edge router", tests for the validity of an authentication token, subsequent routers in the network need not repeat the test, because the packet has already been authorized. Accordingly, in some embodiments, token distribution and authentication testing need only be performed by an edge router that is closest to a given originating device 110.

Accordingly, some embodiments of the present invention bind traffic data with its signaling authentication using an authentication token, to allow a network to recognize that a VoIP packet is part of an approved session. A VoIP packet can, therefore, be authenticated that proper signaling took place to set up the VoIP transmission. In an IPv6 system, the flowID field may be used. Rather than identifying a flow, the token that is placed in the flowID field as an authentication token that identifies that the flow has been authenticated by the network. A given token may be used for multiple flows and/or multiple originating devices, and may be updated and changed as desired to provide a desired level of security and to reduce or prevent hacking of the authentication token(s). In some embodiments, the token need not be changed from call to call, because of the excessive overhead that would be created. Statistics may be kept on the number of invalid attempts to be used to identify points of hacking and/or identify the need for a higher level of service for a given customer.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A Voice over Internet Protocol (VoIP) calling method comprising:
    initiating setup of a voice over internet protocol call using a voice over internet protocol call originating device;
    receiving at the voice over internet protocol call originating device an authentication token for the voice over internet protocol call that is set up that indicates that the voice over internet protocol call is authorized;
    inserting the authentication token for the voice over internet protocol call into packets for the voice over internet protocol call;
    transmitting the packets including the authentication token for the voice over internet protocol call, into an Internet Protocol network;
    wherein the packets are Internet Protocol version 6 packets that include a flowID field;
    wherein inserting the authentication token for the voice over internet protocol call into packets for the voice over internet protocol call comprises inserting the authentication token into the flowID field of the Internet Protocol version 6 packets for the voice over internet protocol call; and
    wherein transmitting the packets including the authentication token, into an Internet Protocol network comprises transmitting the Internet Protocol version 6 packets including the authentication token in the flowID field of the internet protocol version 6 packets, into the Internet Protocol network.

2. A method according to claim 1 further comprising:
    refraining from transmitting the packets into the internet protocol network if the authentication token for the voice over internet protocol call is not received.

3. A Voice Over Internet Protocol call setup method comprising:
    receiving a request to set up a voice over internet protocol call from a device that initiates a voice over internet protocol call;
    providing an authentication token to the device that initiates the voice over internet protocol call if the request to set up a voice over internet protocol call is authorized;
    refraining from providing the authentication token to the device if the request to set up the voice over internet protocol call is not authorized;
    receiving a request to set up a second voice over internet protocol call from a second device;
    providing the authentication token to the second device if the request to set up the second voice over internet protocol call is authorized;
    refraining from providing the authentication token to the second device if the request to set up the second voice over internet protocol call is not authorized;
    wherein the voice over internet protocol call is transmitted using internet protocol version 6 packets that include a flowID field; and
    wherein providing an authentication token to the device if the request to set up a voice over internet protocol call is authorized comprises providing an authentication token that is compatible with the flowID field.

4. A method according to claim 3 wherein providing an authentication token is preceded by:
    receiving an authentication token and parameters governing use of the authentication token.

5. A method according to claim 3 further comprising:
    logging the authentication token for billing purposes.

6. A method according to claim 3 wherein the voice over internet protocol call is a first voice over internet protocol call and wherein the method further comprises:
    receiving a request to set up a second voice over internet protocol call from the device;
    providing the authentication token to the device if the request to set up the second voice over internet protocol call is authorized; and
    refraining from providing the authentication token to the device if the request to set up the second voice over internet protocol call is not authorized.

7. A method according to claim 4 wherein the parameters governing use of the authentication token comprise a time frame in which the authentication token is to be used.

8. A method according to claim 4 wherein the parameters governing use of the authentication token comprise an identification of a plurality of devices for which the authentication token is to be used.

9. A routing method for Voice over Internet Protocol packets comprising:

receiving a voice over internet protocol packet;

refraining from routing the voice over internet protocol packet to a next node in an Internet Protocol network responsive to absence of a valid authentication token in the voice over internet protocol packet;

wherein the voice over internet protocol packets are IP version 6 (Ipv6) packets that include a flowID field; and wherein refraining from routing the voice over internet protocol packet comprises refraining from routing the Ipv6 packet that was received to a next node in the IP network unless a valid authentication token is included in the in the flowID field of the Ipv6 packet.

10. A method according to claim 9 wherein receiving a voice over internet protocol packet is preceded by:

receiving the authentication token and parameters governing validity of the authentication token.

\* \* \* \* \*